(12) United States Patent
Won et al.

(10) Patent No.: US 6,396,981 B1
(45) Date of Patent: May 28, 2002

(54) OPTICAL DEVICE MODULE

(75) Inventors: Jong-hwa Won, Yongin; Yun-ho Jeong, Incheon; Jong-ho Choi, Seoul, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/561,920

(22) Filed: May 1, 2000

(30) Foreign Application Priority Data

Apr. 29, 1999 (KR) .......................................... 99-15431

(51) Int. Cl.$^7$ ................................................ G02B 6/32
(52) U.S. Cl. ........................................... 385/35; 385/31
(58) Field of Search ............................. 385/31, 32, 33, 385/34, 35, 36

(56) References Cited

U.S. PATENT DOCUMENTS

| | | | | |
|---|---|---|---|---|
| 4,934,784 A | * | 6/1990 | Kapany et al. ............. | 359/124 |
| 5,146,515 A | * | 9/1992 | Chao et al. .................. | 385/35 |
| 5,257,336 A | * | 10/1993 | Dautartas .................... | 385/93 |
| 5,434,940 A | * | 7/1995 | Roff et al. ................... | 385/35 |
| 5,771,323 A | * | 6/1998 | Trott ........................... | 385/35 |
| 5,815,623 A | * | 9/1998 | Gilliland et al. .............. | 385/88 |
| 6,061,493 A | * | 5/2000 | Gilliland et al. ............. | 385/140 |
| 6,071,017 A | * | 6/2000 | Gilliland et al. .............. | 385/88 |

* cited by examiner

*Primary Examiner*—Tulsidas Patel
(74) *Attorney, Agent, or Firm*—Sughrue Mion, PLLC

(57) ABSTRACT

An optical device module including an optical fiber for transmitting light, an optical device for receiving light transmitted through the optical fiber, and a lens member installed between the optical fiber and the optical device, for focusing the light emitted from the optical fiber to the optical device, the lens member having a flat plane facing the optical device and a semi-spherical convex plane facing an end of the optical fiber, and the lens member including a concave portion having a predetermined curvature, for transmitting incident light, formed in the center of the convex plane, a light transmitting region corresponding to the concave portion provided in the center of the flat plane, a first reflecting portion formed on the portion of the convex plane excluding the concave portion, and a second reflecting portion formed on the portion of the flat plane excluding the light transmitting region.

16 Claims, 1 Drawing Sheet

OPTICAL DEVICE MODULE

BACKGROUND OF THE INVENTION

1. Field of the Invention

The present invention relates to an optical device module employed to a signal transmission system using light, and more particularly, to an optical device module having an improved structure of a lens installed between an optical device and an optical fiber, for focusing incident light.

2. Description of the Related Art

In general, a data transmission system using light converts an electrical signal into a light signal by a light emitting device such as a semiconductor laser and transmits the light signal to a light receiving device such as a photodetector through an optical fiber. The light receiving device converts again the light signal into an electrical signal.

In a conventional light transmission system shown in FIGS. 1 and 2, a lens 2 or 12 for focusing incident light is installed between an optical device 1 and an optical fiber 3. The optical device 1 is a light emitting device or a light receiving device. In other words, the lens 2 or 12 focuses the light emitted from the light emitting device to then be applied to the optical fiber 3, or focuses the light output from the optical fiber 3 to transmit the same to the light receiving device.

Conventionally, the lenses 2 and 12 are a ball lens shown in FIG. 1 and a gradient index (GRIN) lens shown in FIG. 2. Here, the GRIN lens 12 is a lens in which the refractive index decreases radially from an optical axis. Since the GRIN lens 12 is a plate type, it is easily adhered to the optical fiber 3 so that it is widely employed to an optical signal transmission apparatus.

In the case where the optical device 1 is a light emitting device, in order to increase a light transmission efficiency, the lens 2 or 12 is adjusted so as to align the optical axis between the optical device and the optical fiber 3.

A light receiving device employed for receiving a light signal at a high speed has a relatively small light receiving region for attaining a fast response speed. A light receiving device having an effective light receiving region of about 400 to 500 $\mu$m in diameter is used in transmitting a light signal at a relatively low speed using a multi-mode optical fiber. Also, a light receiving device having an effective light receiving region of about 100 $\mu$m in diameter is used in transmitting a light signal at a relatively high speed using a single-mode optical fiber.

The lenses 2 and 12 employed to optical device modules have a relatively short focal length. In particular, the ball lens 2 has light spots having noticeably different sizes according to the position of a focus.

In the case where the optical device 1 is a light receiving device, due to its small light receiving region, if the optical axis between the optical device 1 and the optical fiber 3 is off-axis or the optical device 1 is not properly positioned on the focus of the lens 2 or 12, the light emitted from the output port of the optical fiber 3 and focused by the lens 2 or 12 may be severely deviated from the effective light receiving region.

Thus, in the conventional optical device module, it is necessary to accurately adjust the optical axis for coinciding the optical axis of the lens 2 or 12 to the core center of the optical fiber 3 in order to optically couple the optical fiber 3 and the optical device 1. Also, an accurate assembly process for accurately positioning the optical device 1 on the focus of the lens 2 or 12 is required.

SUMMARY OF THE INVENTION

To solve the above problems, it is an object of the present invention to provide an optical devise module having an improved structure of a lens capable of optically coupling an optical fiber and an optical device by a simple operation for adjusting an optical axis and a simple assembly process.

Accordingly, to achieve the above object, there is provided an optical device module including an optical fiber for transmitting light, an optical device for receiving light transmitted through the optical fiber, and a lens member installed between the optical fiber and the optical device, for focusing the light emitted from the optical fiber to the optical device, the lens member having a flat plane facing the optical device and a semi-spherical convex plane facing an end of the optical fiber, and the lens member comprising a concave portion having a predetermined curvature, for transmitting incident light, formed in the center of the convex plane, a light transmitting region corresponding to the concave portion provided in the center of the flat plane, a first reflecting portion formed on the portion of the convex plane excluding the concave portion, and a second reflecting portion formed on the portion of the flat plane excluding the light transmitting region.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 3:
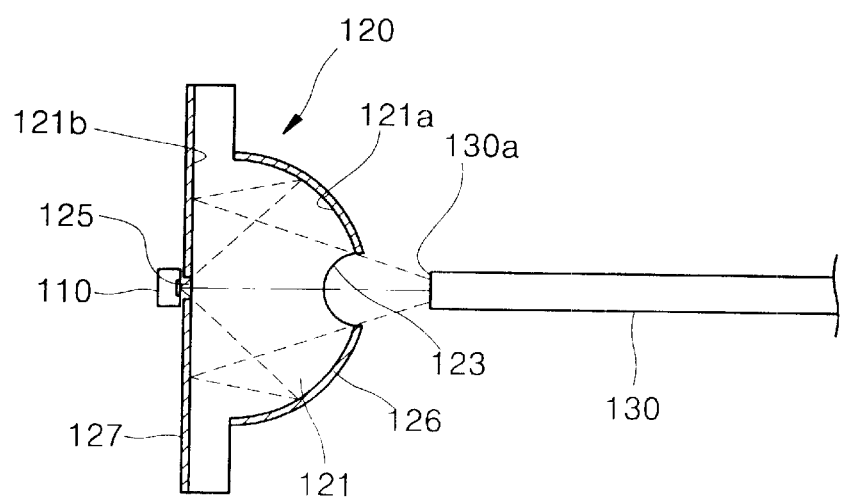
FIG. 3 schematically illustrates an optical device module according to a preferred embodiment of the present invention.

Referring to FIG. 3, an optical device module according to a preferred embodiment of the present invention includes an optical fiber 130 for transmitting light, an optical device 110 for receiving a light signal from the optical fiber 130 to convert the light signal into an electrical signal or convert the electrical signal into a light signal to transmit the same to the optical fiber 130, and a lens member 120 installed between the optical fiber 130 and the optical device 110, for focusing incident light.

The optical device 110 may be a light emitting device for converting an electrical signal into a light signal and outputting the same or a light receiving device for receiving a light signal from the optical fiber 130 and converting the same into an electrical signal. The optical device 110 is positioned on the focus of the lens member 120.

The lens member 120 has a flat plane 121b facing the optical device 110 and a semi-spherical convex plane 121a facing the optical fiber 130. A concave portion 123 having a predetermined curvature, for transmitting incident light, is formed in the center of the convex plane 121a facing an input/output port 130a of the optical fiber 130. A light transmitting region 125 corresponding to the concave portion 123 is provided in the center of the flat plane 121b facing the optical device 110.

A first reflecting portion 126 is formed on the portion of the convex plane 121a excluding the concave portion 123, and a second reflecting portion 127 is formed on the portion of the flat plane 121b excluding the light transmitting region 125. Thus, the light emitted from the optical fiber 130 is reflected at the second reflecting portion 127 and the first reflecting portion 126 in sequence, as indicated by dotted lines to then be directed to the optical device 110 through the light transmitting region 125. Conversely, the light emitted from the optical device 110 travels reversely along the same path to then be directed to the optical fiber 130.

Figure 1:
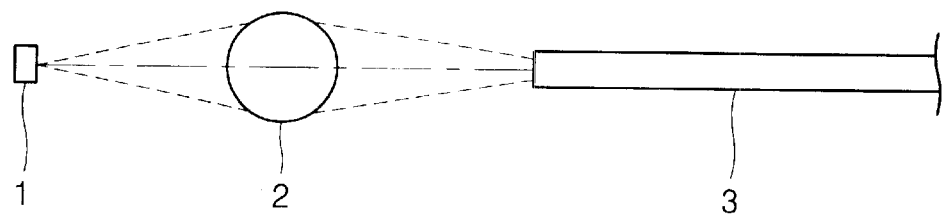
FIG. 1 schematically illustrates a conventional optical device module employing a ball lens.
Figure 2:
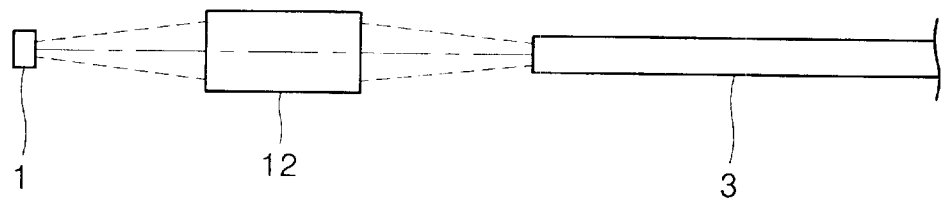
FIG. 2 schematically illustrates a conventional optical device module employing a gradient index (GRIN) lens.

In the case where the optical device 110 is a light receiving device, the light emitted from the optical fiber 130 becomes divergent light by the concave portion 123 and the second reflecting potion 127 to then be focused by the first reflecting portion 126. Thus, the light spot formed on the optical device 110 is much smaller than the case of employing the conventional ball lens (2 of FIG. 1) or GRIN lens (12 of FIG. 2). Error allowance for alignment of an optical axis, for making a light spot land within an effective light receiving region, becomes large, compared to the conventional one. This makes it possible to employ a light receiving device having a relatively small effective light receiving region to be easily applied to high-speed transmission of a light signal.

On the other hand in the case where the optical device 110 is a light emitting device, the partial light emitted from the light emitting device to then be incident into the concave portion 123 is focused at the concave portion 123 and is received in the input port 130a of the optical fiber 130. Also, the partial light incident into the first reflecting portion 126 is reflected and focused thereby and then is reflected again at the second reflecting portion 127 to then be incident into the concave portion 123. Then, the light is focused by the concave portion 123 to then be incident into the input port 130a of the optical fiber 130.

Here, even though the light is emitted from the optical device 110 at a large angle of emission, it is focused by the lens member 120 of the present invention to then be input to the optical fiber 130 at a small angle of incidence. Therefore, most of the light can be incident into the optical fiber 130 at an angle of incidence, satisfying a total reflection condition in which light signal transmission through the optical fiber 130 is allowed, thereby greatly increasing a light coupling efficiency, compared to the conventional ball lens (2 of FIG. 1) or GRIN lens (12 of FIG. 2).

According to the present invention, alignment of the optical axis between the optical fiber 130 and the lens member 120, which is necessary for optically connecting the optical fiber 130 and the optical device 110, can be sufficiently attained through manual adjustment by using the lens member 120.

Also, since light is reflected twice so that the effective light path between the output port 130a of the optical fiber 130 and the optical device 110 becomes long, a change in the spot size of light is less sensitive to deviation from the focus than the conventional case, which increases the degree of freedom in assembly of an optical device module.

As described above, in the optical device module according to the present invention, an optical fiber and an optical device can be optically connected to each other by simple adjustment of an optical axis and a simple assembling process.

What is claimed is:

1. An optical device module comprising:
   an optical fiber for transmitting light;
   an optical device for receiving light transmitted through the optical fiber; and
   a lens member installed between the optical fiber and the optical device, for focusing the light emitted from the optical fiber to the optical device, the lens member having a flat plane facing the optical device and a semi-spherical convex plane facing an end of the optical fiber, the lens member comprising a concave portion having a predetermined curvature, for transmitting incident light, formed in a center of the convex plane, a light transmitting region corresponding to the concave portion provided in a center of the flat plane, a first reflecting portion formed on the portion of the convex plane excluding the concave portion, and a second reflecting portion formed on the portion of the flat plane excluding the light transmitting region.

2. An optical device module comprising:
   an optical fiber for transmitting light;
   an optical device for emitting light to the optical fiber; and
   a lens member installed between the optical fiber and the optical device, for focusing the light emitted from the optical device to the optical fiber, the lens member having a flat plane facing the optical device and a semi-spherical convex plane facing an end of the optical fiber, the lens member comprising a concave portion having a predetermined curvature, for transmitting incident light, formed in a center of the convex plane, a light transmitting region corresponding to the concave portion provided in a center of the flat plane, a first reflecting portion formed on the portion of the convex plane excluding the concave portion, and a second reflecting portion formed on the portion of the flat plane excluding the light transmitting region.

3. The optical device module of claim 1, wherein the optical device comprises a photodetector.

4. The optical device module of claim 2, wherein the optical device comprises a semiconductor laser.

5. An optical device module comprising:
   an optical fiber having a port for transmitting light;
   an optical device; and
   a lens member installed between the optical fiber and the optical device for focusing incident light, the lens member including:
     a flat plane facing the optical device and a semi-spherical convex plane facing the port of the optical fiber;
     a concave portion having a predetermined curvature, the concave portion formed in a center of the convex plane and facing the port of the optical fiber; and
     a light transmitting region corresponding to the concave portion, provided in a center of the flat plane, and facing the optical device.

6. The optical device module of claim 5, wherein the convex plane of the lens member includes a first reflecting portion formed on a portion of the convex plane excluding the concave portion.

7. The optical device module of claim 5, wherein the flat plane portion of the lens member includes a second reflecting portion formed on a portion of the flat plane excluding the light transmitting region.

8. The optical device module of claim 5, wherein the optical device comprises a light emitting device for receiving an electrical signal and converting the electrical signal into a light signal and outputting the light signal to the optical fiber.

9. The optical device module of claim 5, wherein the optical device comprises a semiconductor laser.

10. The optical device module of claim 5, wherein the optical device comprises a light receiving device for receiving a light signal from the optical fiber and converting the light signal into an electrical signal.

11. The optical device module of claim 5, wherein the optical device comprises a photodetector.

12. The optical device module of claim 5, wherein the optical device is positioned on a focus of the lens member.

13. The optical device module of claim 5, wherein the port of the optical fiber comprises an input port.

14. The optical device module of claim 5, wherein the port of the optical fiber comprises an output port.

15. A method of focusing incident light in a signal transmission system, the method comprising:

transmitting light through an optical fiber;

reflecting the light emitted from the optical fiber to an optical device using a lens member, the lens member having a flat plane portion and a concave portion and installed between the optical device and the optical fiber; and receiving the reflected light by the optical device.

16. A method of focusing incident light in a signal transmission system, the method comprising:

emitting light from an optical device;

reflecting the light emitted from the optical device to a port of an optical fiber using a lens member, the lens member having a flat plane portion and a concave portion and installed between the optical device and the optical fiber; and receiving the reflected light by the optical fiber.

* * * * *